(12) United States Patent
Amine

(10) Patent No.: US 6,319,632 B1
(45) Date of Patent: Nov. 20, 2001

(54) ACTIVE MATERIAL FOR LITHIUM BATTERIES

(75) Inventor: Khalil Amine, Downers Grove, IL (US)

(73) Assignee: Japan Storage Battery Co., Ltd., Kyoto (JP)

( * ) Notice: Subject to any disclaimer, the term of this patent is extended or adjusted under 35 U.S.C. 154(b) by 0 days.

(21) Appl. No.: 09/448,504

(22) Filed: Nov. 24, 1999

(51) Int. Cl.$^7$ ...................................... H01M 4/58

(52) U.S. Cl. .................................... 429/218.2; 429/218.1; 429/220; 429/231.1

(58) Field of Search ................................ 429/218.2, 220, 429/231.1, 218.1

(56) References Cited

U.S. PATENT DOCUMENTS 3,736,184 * 5/1973 Dey et al. ............................ 429/337

FOREIGN PATENT DOCUMENTS 11-111295 * 4/1999 (JP) .

OTHER PUBLICATIONS

Abstract of Japanese patent No. JP 09134724 A, May 1997.*

* cited by examiner

Primary Examiner—Hoa Van Le
(74) Attorney, Agent, or Firm—Sughrue, Mion, Zinn, Macpeak & Seas, PLLC

(57) ABSTRACT

An active material of formula $LiCu_{1+x}PO_4$ ($0 \leq x \leq 1$) which could be used as cathode material in lithium primary and secondary batteries.

4 Claims, 7 Drawing Sheets

2θ/°K (α)

BINDING ENERGY, eV

ACTIVE MATERIAL FOR LITHIUM BATTERIES

BACKGROUND OF THE INVENTION

1. Field of the Invention

The present invention relates an active material used for lithium ion batteries.

2. Description of the Related Art

Small secondary batteries are being used in increasing numbers to power portable equipment such as tools, toys, lighting, and more significantly in consumer electronic devices such as computer, camcorder, cellular phones and so on. More recently, secondary lithium batteries have received renewed interest with respect to employing a Li-insertion compound as anode instead of metallic Li to give the "lithium ion" batteries. This system, however, require careful selection of cathode and anode hosts. The layered $LiMeO_2$ (Me: Co, Ni) [Mat. Res. Bull. 15 (1980) 783, J. Appl. Phys. 19 (1980) 305] and the three dimensional spinel oxide $LiMn_2O_4$ [Mat. Res. Bull. 18 (1983) 461, Mat. Res. Bull., 19 (1984)179] having a mid discharge voltage at about 4V against lithium have become attractive cathode for lithium ion batteries. More recently, other type of cathode materials were investigated for a possible use in lithium ion system. These compounds are composed of Nasicon related 3D framework such as $Li_xM_2(PO_4)_3$ (M: Ti, V, Fe) and $M_2(SO_4)_3$ (M: Ti, Fe) [Solid State ionic 92 (1996) 1]. In the undisclosed Japanese patents 9-134 725, 9-134 724, 9-171 827 and 9-134724 $LiMPO_4$, M: Ni, Co, Mn, Cu were claimed. These materials have an Olivine structure totally different from materials of the present invention.

As for primary lithium batteries, there were candidates of cathode materials of phosphate or arsenates of heavy metals such as $Cu_3(PO_4)_2$, $Ag_3PO_4$, $Cu_3(AsO_4)_2$ and $Ag_3AsO_4$ [U.S. Pat. No. 3,736,184]. However these materials have not been put into practice so far.

SUMMARY OF THE INVENTION

The invention relates to a new active material of formula $LiCu_{1+x}PO_4$ (0x1) which could be used as positive active material for lithium primary and secondary batteries.

DETAILED DESCRIPTION OF THE INVENTION

The invention will now be described, by way of non limiting illustrative examples, with reference to experiment which the applicant has conducted and with reference to the accompanying figures.

EXAMPLE-1

$LiCu_{1+x}PO_4$ ($0 \leq x \leq 0.5$) in accordance of the present invention was prepared using an one stage reaction involving a stoichiometric mixture of $Li_2CO_3$, CuO and $(NH_4)_2HPO_4$. The mixture was first ground in an agate mortar and pressed into a pellet at 400 kgf/cm$^2$ and then calcined in air at 450° C. for 4 hours followed by heating at 800° C. for 24 hours. The obtained material presented a blue color.

EXAMPLE 2

$LiCu_{1+x}PO_4$ ($0.5 < x \leq 1$) in accordance of the present invention was prepared using an one step reaction involving a stoichiometric mixture of $Li_2CO_3$, 2CuO, $(NH_4)_2HPO_4$. The mixture was first ground in an agate mortar and pressed into a pellet at 400 kgf/cm$^2$ and then calcined in air at 450° C. for 4 hours followed by heating at 800° C. for 24 hours. The obtained material presented a green color.

Figure 1A:
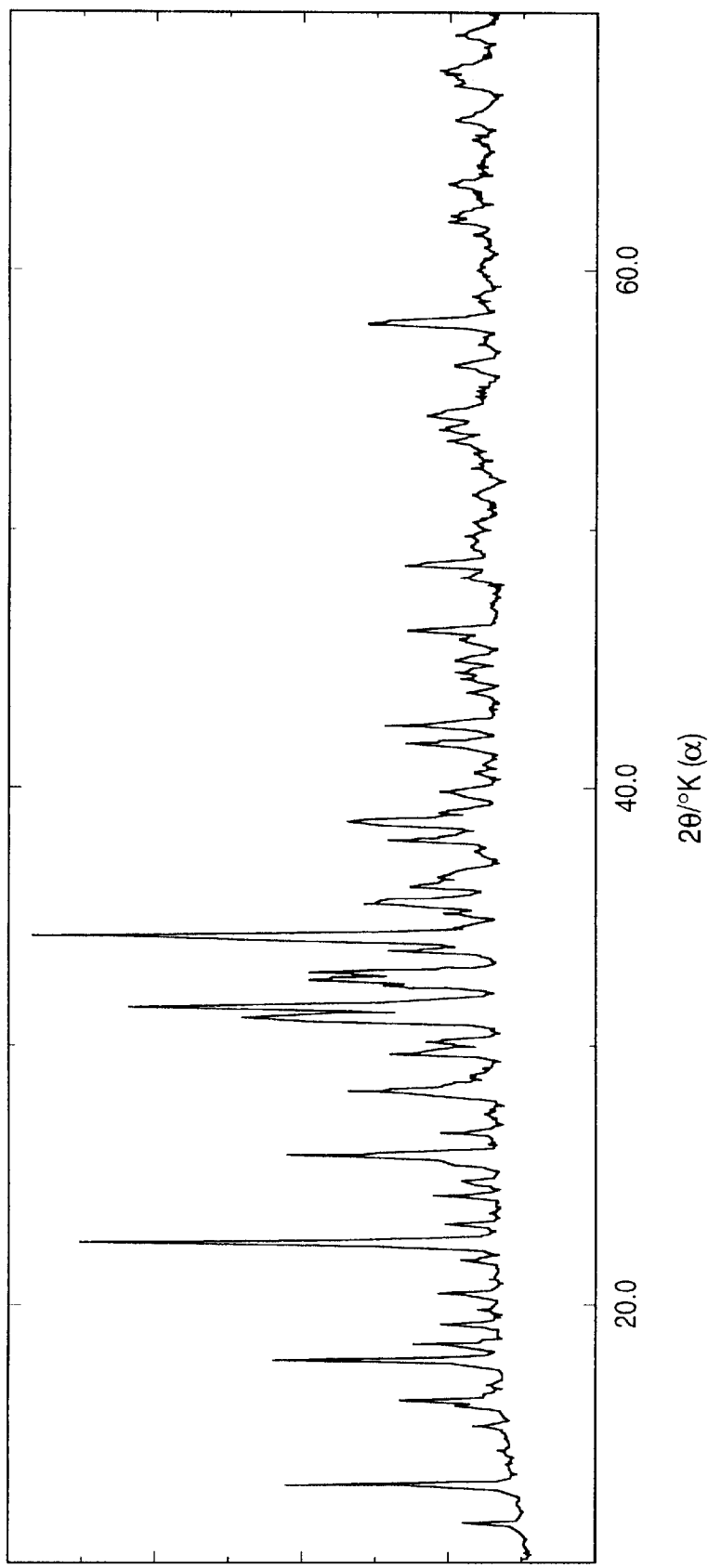
FIG. 1A shows the X-ray diffraction pattern of the material $LiCuPO_4$ of the present invention.
Figure 1B:
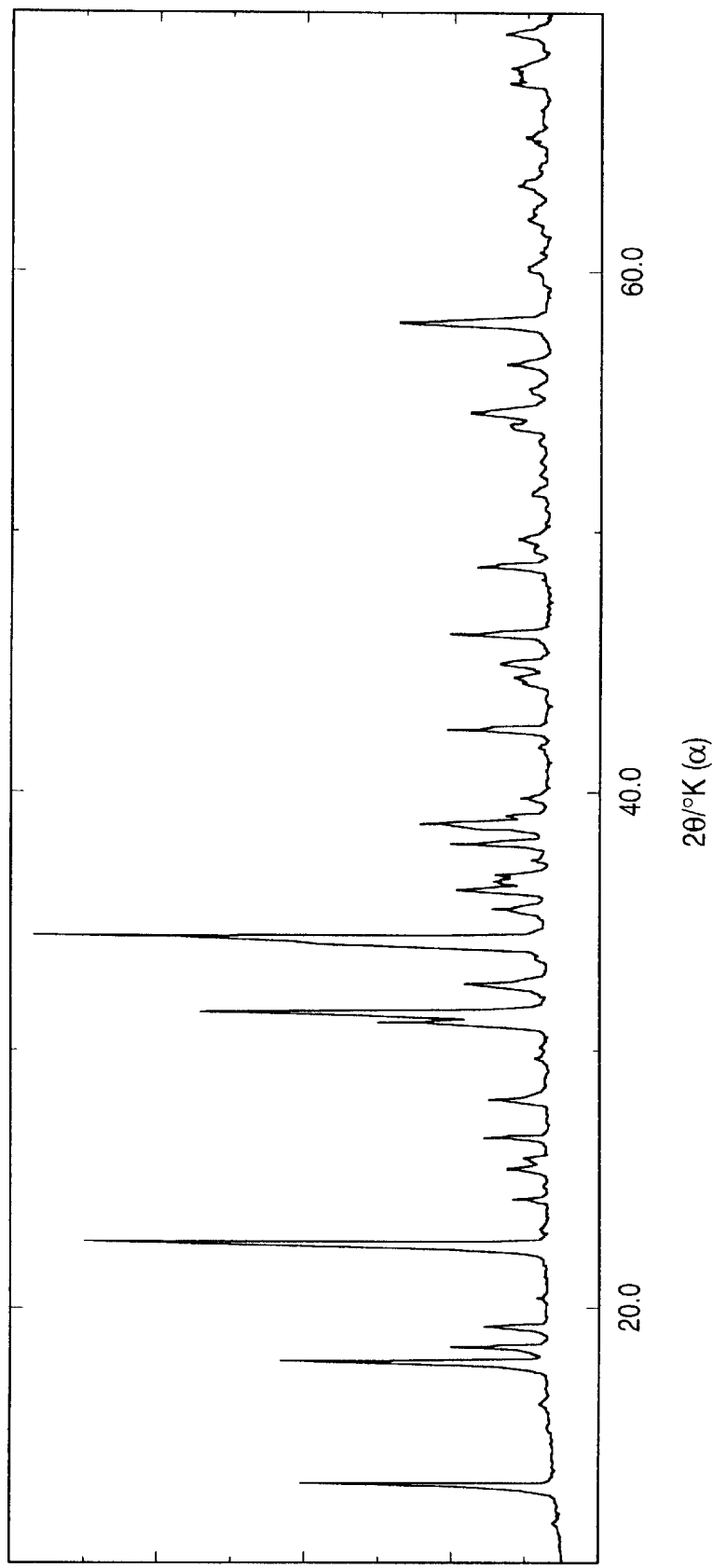
FIG. 1B shows the X-ray diffraction pattern of the material $LiCu_2PO_4$ of the present invention.

FIGS. 1A and 1B, show the x-ray diffraction patterns of $LiCu_{1+x}PO_4$ with x=0 and x=1, respectively, obtained according to the present invention. For material with x=0, the material presents many peaks making it difficult to index. Since this patterns couldn't be indexed as mixed compounds of already known Li, Cu and phosphate based materials, we therefore, believe that the material of the present invention corresponds to a new phase. Similar patterns was also observed for materials $LiCu_{1+x}PO_4$ with ($0 \leq x \leq 0.5$). However for x=1, x-ray diffraction pattern could be indexed with orthorhombic symmetry and unit cell parameters: a=5.31±0.5 Å, b=13.43±0.5 Å and c=4.91±0.5 Å. Similar patterns were observed for materials $LiCu_{1+x}PO_4$ with ($0.5 < x \leq 1$).

Figure 2:
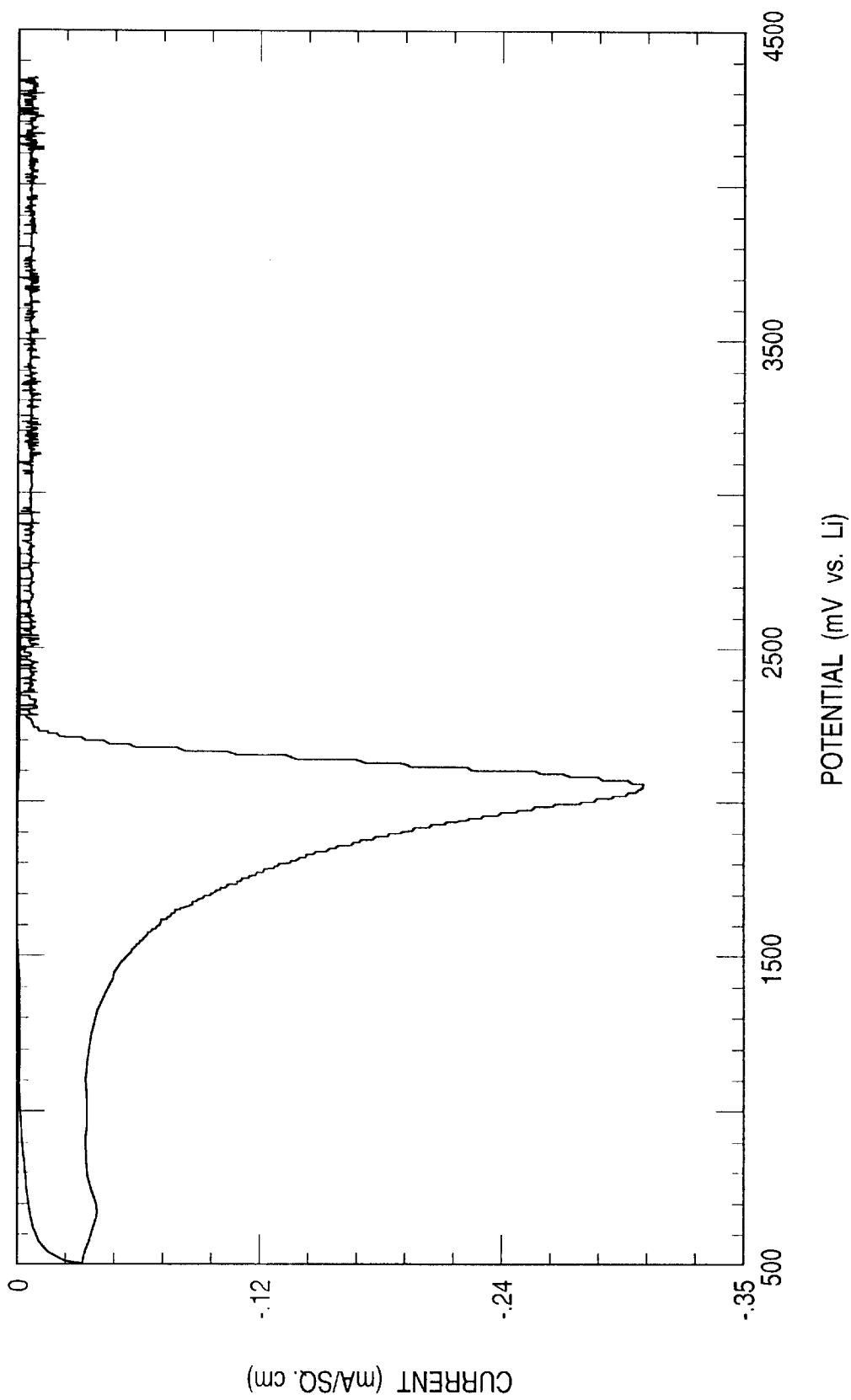
FIG. 2 shows the cyclic voltammogram of the material $LiCuPO_4$ of the present invention (Scan rate was 2 mV/min.)

FIG. 2 shows an example of the cyclic voltammeter of $LiCuPO_4$. The material exhibits only one reduction peak at around 2.1 V without corresponding oxidation peak. In this case, $LiClO_4$/2EC+2DMC+DEC was used as electrolyte at a scanning rate of 0.2 mV/min.

Figure 3:
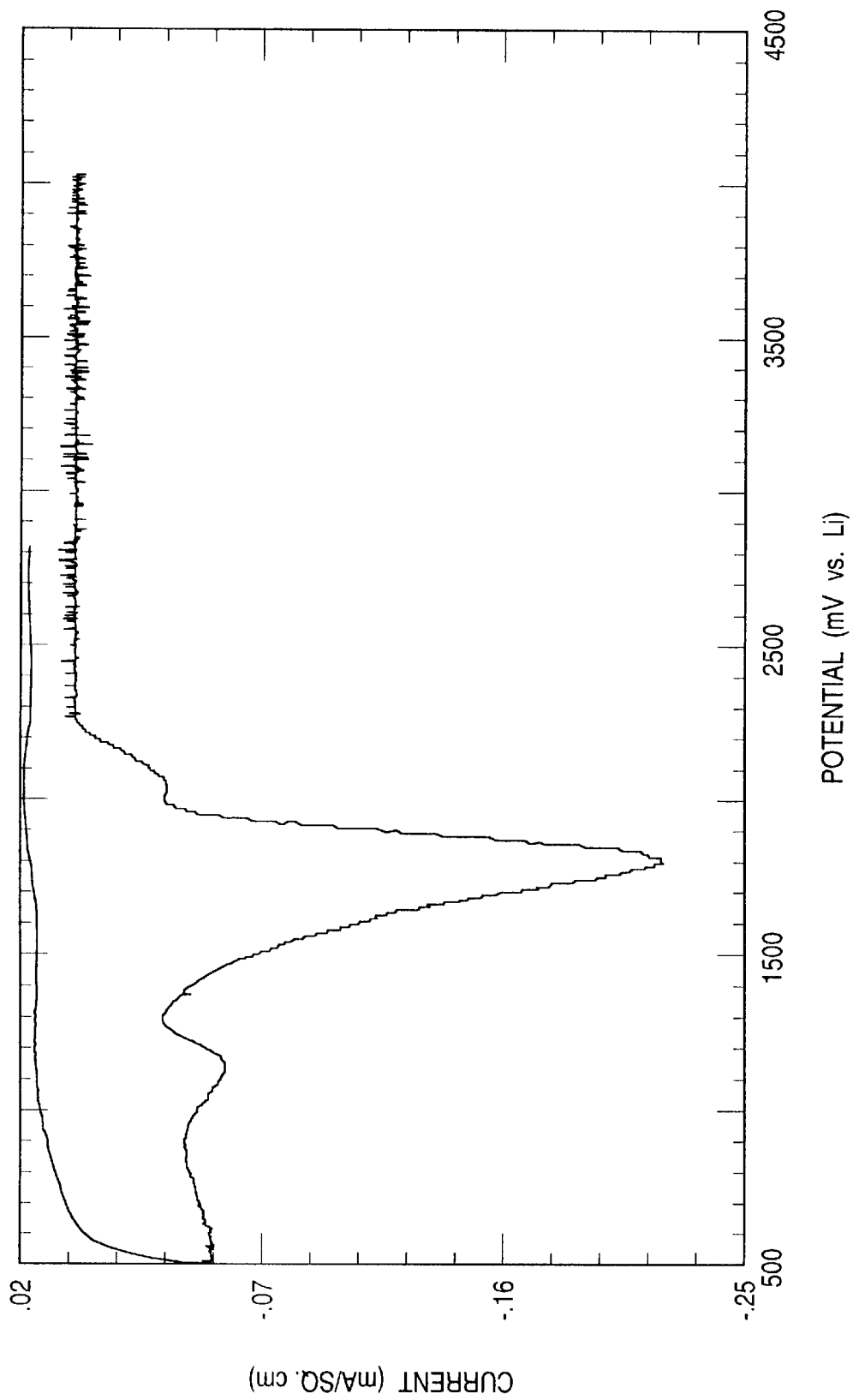
FIG. 3 shows the cyclic voltammogram of the material $LiCu_2PO_4$ of the present invention (Scan rate was 2 mV/min.)

FIG. 3 shows an example of the cyclic voltammeter of $LiCU_2PO_4$. The material exhibits only one reduction peak at around 1.85V vs Li/Li$^+$ without corresponding oxidation peak. An other small reduction peak was observed at around 1.2 V vs Li/Li$^+$. In this case, $LiClO_4$/2EC+2DMC+DEC was used as electrolyte at a scanning rate of 0.2 mV/min.

Figure 4:
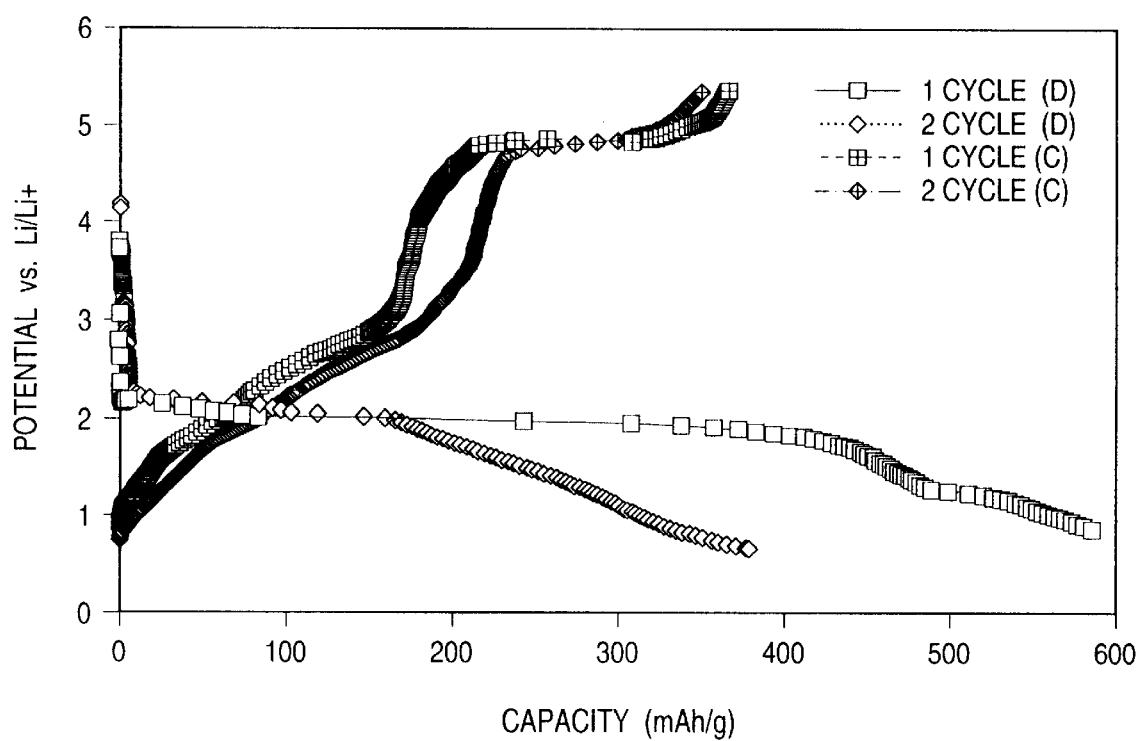
FIG. 4 shows the charge and discharge curves of the first two cycles of a cell made of lithium counter, lithium reference and an electrode made of the active material $LiCuPO_4$ of the present invention. In this case, the cell was charged up to 5.3V and discharged down to 0.6V (D;Discharge,C;Charge)

FIG. 4 shows the charge and discharge curves of the first two cycles of the material $LiCuPO_4$ of the present invention. The test was conducted in glass cell type using $LiClO_4$/2EC+2DMC+DEC at a current density of 0.1 mA/cm$^2$. The cell comprises a positive electrode (87% of the active material of the present invention, 5% carbon black, 8% PVDF), a lithium counter and a lithium reference. First the cell was discharged to intercalate additional lithium into the material of the present invention. The cell shows a flat plateau at 2 V vs Li/Li$^+$ during the discharge process with a very high capacity of 600 mAh/g. This large capacity reveals the formation of lithium rich material during the discharge process.

Figure 5:
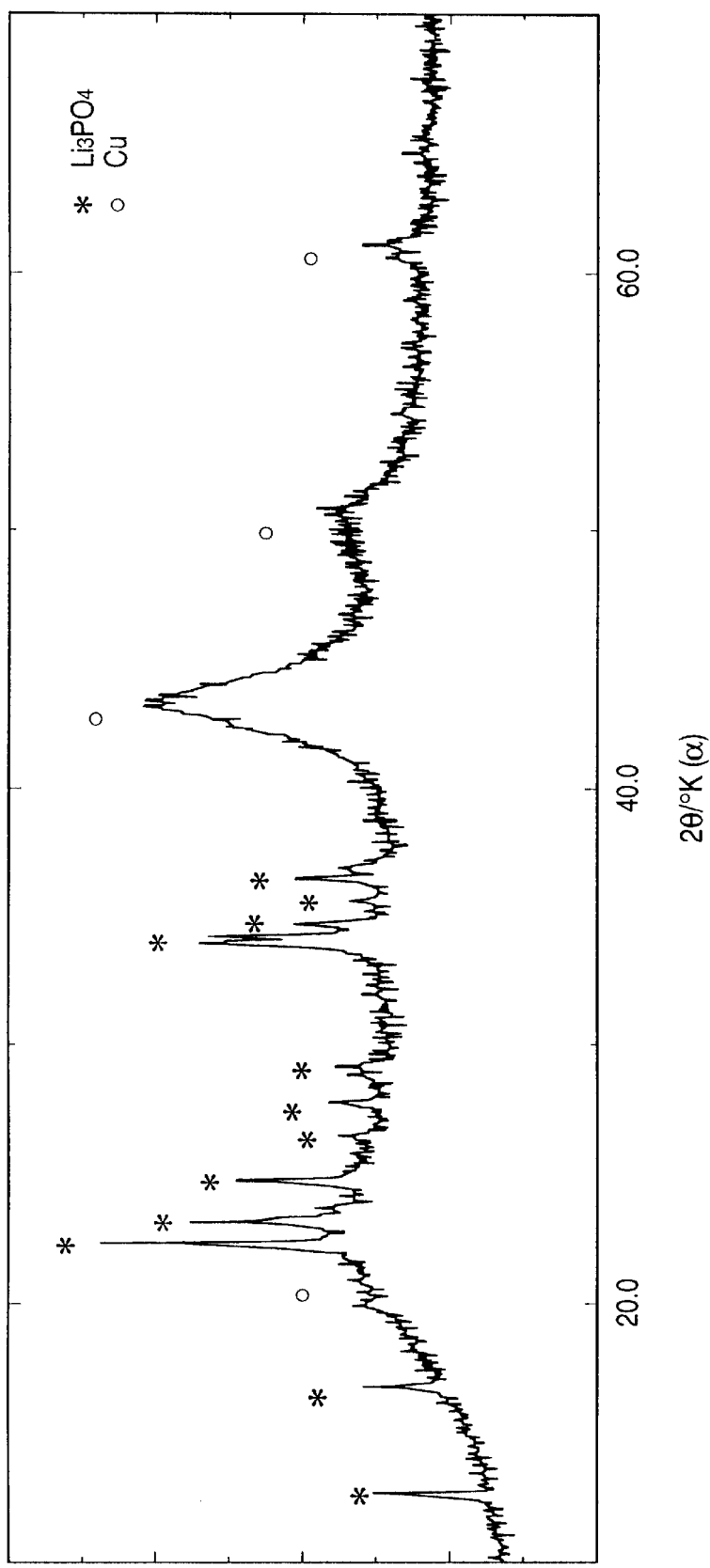
FIG. 5 shows the X-ray diffraction patterns of $LiCuPO_4$ after discharge.
Figure 6:
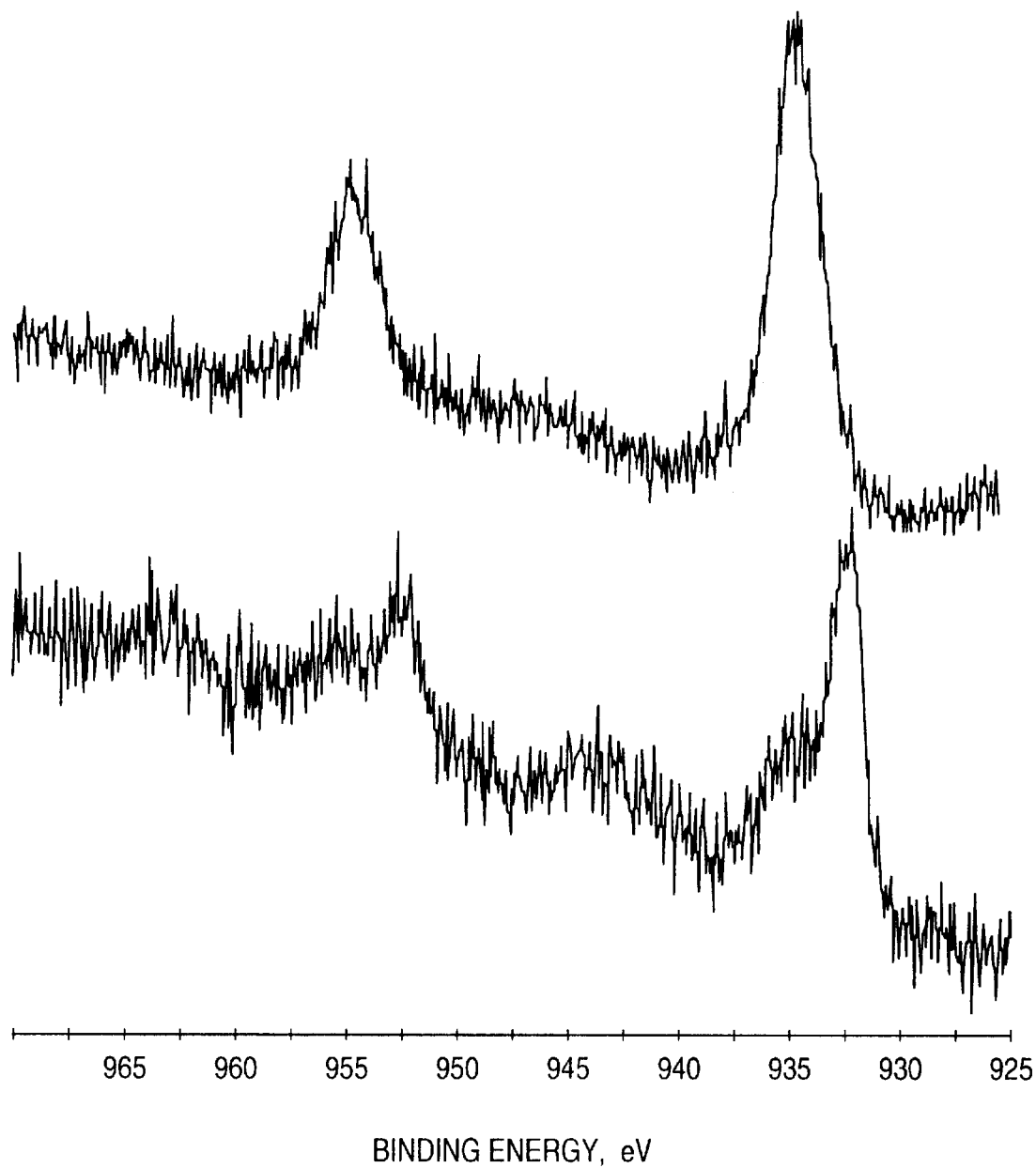
FIG. 6 shows $Cu_{2p}$ XPS emission spectra of $LiCuPO_4$ (A) before and (B) after discharge.

FIG. 5 shows the X-ray diffraction pattern of $LiCuPO_4$ after discharge. Two new phases corresponding to $Li_3PO_4$ and metallic copper was obtained. This result reveals that $LiCu_{1+x}PO_4$ ($0 \leq x \leq 1$) material decomposes to lithium rich $Li_3PO_4$ and metallic copper during the discharge process. Therefore, the large discharge capacity observed in this material could be due to the decomposition reaction and formation of lithium rich $Li_3PO_4$. FIG. 6 shows the $Cu_{2p}$ XPS emission spectra of $LiCuPO_4$ before and after discharge. After discharge, the peaks are shifted toward low binding energy of 932.5 eV characteristics of metallic copper. This result confirms clearly the presence of metallic copper in the discharge $LiCuPO_4$.

The invention relates to a new active material of formula $LiCu_{1+x}PO_4$ ($0 \leq x \leq 1$) having different structure depending on x values and which could be used as cathode material in lithium primary batteries with a capacity as high as 600 mAh/g and a potential of 2V vs $Li/Li^+$.

What is claimed is:
1. An active material for batteries comprising a meterial expressed by formula $LiCu_{1+x}PO_4$ ($0 \leq x \leq 1$).
2. The active material in accordance with claim 1, wherein the structure is orthorhombic for $0.5 < x \leq 1$.
3. The active material in accordance with claim 2, wherein the unit cell parameter of the orthorhombic cell are: a=5.31 Å±0.5 Å, b=13.43 Å±0.5 Å and c=4.91 Å±0.5 Å.
4. A method of preparing the active material comprising the steps of:
    mixing and pressing ground $Li_2CO_3$, CuO and $(NH_4)_2HPO_4$ at 400 kgf/cm²±50 kgf/cm²; and
    heating the mixture in at least two steps at 450° C.±50° C. and then at 800° C.±100° C. to produce an active material comprising a meterial expressed by formula $LiCu_{1+x}PO_4$ ($0 \leq x \leq 1$).

* * * * *